United States Patent [19]

Naylor, Jr.

[11] Patent Number: 5,526,021

[45] Date of Patent: Jun. 11, 1996

[54] DITHERING OPTIMIZATION TECHNIQUES

[75] Inventor: William C. Naylor, Jr., Mount Kuring-gai, Australia

[73] Assignee: Canon Inc., Tokyo, Japan

[21] Appl. No.: 177,308

[22] Filed: Jan. 4, 1994

[30] Foreign Application Priority Data

Jan. 11, 1993 [AU] Australia ................................. PL6754

[51] Int. Cl.$^6$ ...................................................... G09G 5/10
[52] U.S. Cl. ............................ 345/149; 358/456; 358/457
[58] Field of Search ...................................... 345/147, 149, 345/136, 137, 138; 358/456, 457, 455

[56] References Cited

U.S. PATENT DOCUMENTS

| | | | |
|---|---|---|---|
| 4,920,501 | 4/1990 | Sullivan et al. | 364/518 |
| 5,111,310 | 5/1992 | Parker et al. | 358/456 |
| 5,164,717 | 11/1992 | Wells et al. | 345/149 |
| 5,214,517 | 5/1993 | Sullivan et al. | 358/456 |
| 5,363,213 | 11/1994 | Coward et al. | 358/457 |

FOREIGN PATENT DOCUMENTS

| | | |
|---|---|---|
| 0560285 | 9/1993 | European Pat. Off. . |
| 0593304 | 4/1994 | European Pat. Off. . |
| WO9112686 | 8/1991 | WIPO . |

OTHER PUBLICATIONS

S. Kirkpatrick, et al., "Optimization by Simulated Annealing", Science 220, pp. 671–680 (1983).

C. Gotsman, "Halftoning of Image Sequences", The Visual Computer, 9, pp. 255–266 (1993).

D. L. Neuhoff, et al., "One–Dimensional Least–Squares Model–Based Halftoning", ICASSP-92, vol. 3, M, Multi-dimensional Signal Processing, 1992 IEEE International Conference on Acoustics, pp. III–189–III–192 (Mar. 1992).

Primary Examiner—Curtis Kuntz
Assistant Examiner—Vivian Chang
Attorney, Agent, or Firm—Fitzpatrick, Cella, Harper & Scinto

[57] ABSTRACT

A process of producing large dither matrices suitable in use in halftoning images is disclosed. This process includes forming an objective function based on the placement of the dither values within the matrix and optimizing the objective function so as to produce an improved matrix. The preferred optimizations process includes the use of simulated annealing with additional optimizations of the simulated annealing process being disclosed.

20 Claims, 6 Drawing Sheets

DITHERING OPTIMIZATION TECHNIQUES

FIELD OF THE INVENTION

The present invention relates to the field of digital imaging and more particularly to a method for digital halftoning images using large dither matrices.

BACKGROUND ART

The prior art will now be described with reference to the following drawings in which:

FIG. 1 is a schematic view of a conventional single pixel of a CRT type display;

FIGS. 2(1) to 2(5) are schematic views of a 2×2 dithering process;

FIG. 3 is an illustration of the dithering process; and

FIG. 4 is an illustration of an artifact producing matrix.

Colour raster graphic display devices are well known in the art. The display of colour images in these devices is normally achieved by means of a pixel map comprising individual pixels. These pixels in turn consist of a collection of bits which represent the colour value of that pixel on the display device. The number of different possible bits in this collection corresponds with the number of different colours which may be displayed by the display device and hence the fidelity with which the device can display a given picture. Common colour systems store 8 or 24 bits per pixel, although other variations are possible.

A display device displays the corresponding colour value of the pixel, often to a high resolution. Common screen displays are capable of displaying a number of different pixels in the range of 1280 by 1024 pixels with each pixel capable of displaying up to $2^{24}$ different colour values.

Colours are often displayed on a computer display according to a particular model. The red, green, blue (RGB) colour model is one that is in common use with Cathode Ray Tubes (CRT) and colour raster display devices. Other colour display models include cyan, magenta, yellow (CMY) often used in colour-printing devices. An example of the RGB model is in the NTSC picture display standard in common use with computer displays. In this standard, each pixel element is divided into 3 separate sub-groupings. These separate subgroupings represent the Red, Green and Blue portion of a given pixel element respectively.

Referring now to FIG. 1, the viewing surface of a colour CRT often consists of closely spaced pixels 20. Each pixel can be made up of a red 21, green 22 and blue 23 phosphor dot or pixel elements. These dots are so small that light emanating from the individual dots is perceived by the viewer as a mixture of the corresponding three colours. A wide range of different colours can thus be produced by a pixel element by variation of the strength with which each phosphor dot is excited. A conversion arrangement (not illustrated) is normally provided so that the strength of each phosphor dot's excitation has some proportionality to the value of each of the above mentioned pixel element subgrouping. By way of example, a 24 bits per pixel colour display system divided into 8 bits for each of the three colours red, green and blue will be assumed. This corresponds to $2^8$ or 256 separate intensity levels of each of red, green and blue respectively and $2^{24}$ different colour values. A colour display capable of displaying this many colours can approximate a continuous tone image to such a degree that for all practical purposes the display can be considered to be a continuous tone display.

Many display devices are unable to actually display the full range of colours provided by, for example, a 24 bit input pixel. For example, a black and white raster image display can only display 2 colours, namely black and white and is known as a bi-level device. Other colour display devices can only display a finite number of discrete intensity levels for each colour unit. By way of further example, in a colour bi-level device, such as a ferroelectric liquid crystal display (FLCD), each dot on the screen can be at just two intensity levels, either fully on or fully off.

If the display device receives an input which has been generated on the basis that each pixel is able to display a larger number of intensity levels than can actually be displayed, then there will be an error in the colour displayed, being the difference between the exact pixel value required to be displayed and the approximated value actually displayed.

Methods of generating input signals to displays have been developed to increase the number of colours displayable on an discrete colour display device such as a bi-level colour display by grouping pixels together. The methods used are known generally as halftoning. For an explanation of the different aspects of halftoning the reader is referred to the book 'Digital Halftoning' by Robert Ulichney, published in 1991 by MIT Press.

FIGS. 2 and 3 show one such method, called dithering, used for increasing the number of intensity levels. In this example, the pixel arrangement of FIG. 1 of the display screen is grouped together into a 2×2 pixel area 24. The 2×2 pixel area 24 of a bi-level display is used to produce five separate intensity levels for each primary colour by selectively turning on an individual primary pixel. These levels range from a lowest level shown in FIG. 2(1), a first level of brightness shown in FIG. 2(2), a second level brightness shown in FIG. 2(3), a third level shown in FIG. 2(4) and a fourth level shown in FIG. 2(5), giving a total of 5 levels. In general, a grouping of n pixel elements will be able to produce a maximum of n+1 separate intensity levels for each primary colour.

For ease of understanding, the discussion will proceed in relation to a bi-level display capable of displaying only a single primary colour, namely black or white. Those skilled in the art will however appreciate that the same principles can be applied to a display having multiple primary colours by treating each primary colour separately, independent of the other primary colours that a given display is using. Additionally, the discussion can also be applied to a display, where each individual element has multiple intensity levels through the grouping together of n+1 separate intensity levels.

In the method of dithering an image, the decision to intensify a particular point on the screen $O(x,y)$ is made dependent on the desired intensity $S(x,y)$ at that particular point and on a predetermined dither matrix value $D(i,j)$. To display the required point at $O(x,y)$, it is necessary to generate $$i = x \bmod n \qquad \text{(EQ 1)}$$

$$j = y \bmod m \qquad \text{(EQ 2)}$$

Where x and y are the pixel positions and n and m are the desired lengths and widths of the dither Matrix D. Then, if $S(x,y) > D(i,j)$, the point at $O(x,y)$ is intensified, otherwise it is not. An example of this process is shown in FIG. 3. Input matrix 30 containing $S(x,y)$, and dither matrix 30 containing locations $D(i,j)$ 31, are used in conjunction with the above display intensification rule to produce output matrix elements O(x,y) with 0 corresponding to those points that are not intensified, and 1 corresponding to those points that are intensified. Hence, input element S(0,0) with a value of 0, will be compared with D(0,0) which has a value 0 also, and the comparison determination is not satisfied, so the point O(0,0) will not be intensified. Input element S(2,3) with a value of 3, will be matched with dither matrix element D(0,1) since 2 modulo 2=0 and 3 modulo 2=1. D(0,0) has a value 1, so the output element O(2,3) is iilluminated and so on.

The above example is a sample operation of a dither matrix of size 2×2 elements, for a black and white display. The choice of particular values of a dither matrix, although somewhat arbitrary, is determined by a number of important factors including:

1. The display device which is to display the image. Some devices, such as laser printers and film recorders, are poor at reproducing isolated 'on' pixels and hence dither matrix elements must be chosen such that output matrix elements are clustered together as much as possible. Such choices are known by the name 'clustered-dot ordered dither'.

2. The need to avoid the introduction of visual artifacts. It is common for an output image to display regions of equal or slowly varying intensities of a particular colour. Certain permutations of matrix values will result in artifacts such as lines appearing when displaying these areas. Referring now to FIG. 4, a 3×3 dither matrix 33 is shown illustrated which results in horizontal lines appearing in any large area of the image which had an intensity equal to 3.

3. Preferably the dither matrix should encompass all the values in the range 0 to the maximum value desired to be output. For example common computer systems store images as 8 bit levels for each primary colour. Hence a dither matrix that includes 256 different values is desirable to increase the 'granularity' of displayable values. Additionally, with larger matrices, it is desirable to repeat each value multiple times.

By increasing the number of pixels grouped together for use with a dither matrix, it is not readily apparent how to assign values to the dither matrix. For example, if the size of the dither matrix is of the order of 60×68 elements, there will be 4,080 possible intensity value elements in the dither matrix which must be assigned.

U.S. Pat. No. 5,214,517 by Sullivan discloses one method of halftoning an image by means of multilevel correlated minimal visual noise binary patterns created through a process known as simulated annealing and using a separate halftone bit pattern memory for each possible level of input, thereby resulting in a substantial increase in the necessary pattern storage space. The present invention relies on the creation of a standard dither matrix rather than multiple level bit patterns in addition to disclosing the use of methods different to those disclosed in the Sullivan patent.

It is an object of the present invention to provide an improved method of displaying images on a discrete level output display by providing a process whereby the intensity value elements in the dither matrix can be advantageously assigned.

SUMMARY OF THE INVENTION

According to one aspect of the present invention there is disclosed a method for determining the values of a dither matrix comprising an array of points, said method comprising the steps of:

assigning initial values to each point in the dither matrix;

forming a suitable objective function based on said assignment; and optimizing said objective function through alteration of said dither values.

According to a another aspect of the present invention there is disclosed an image data generator comprising a store, or memory, containing values of a dither matrix at locations in the store corresponding to locations in the matrix, and comparator means to compare each pixel of the image to be displayed with the value in said store at the modulo location corresponding to the pixel. An output of the comparator means is activated if the stored value is greater than the pixel value and that output is displayed on a display means. If the stored value is less than the pixel value, then the display means is not activated, wherein the values the dither matrix are determined by the steps of:

determining a suitable objective for display of corresponding dither pixels; and optimizing said objective to improve image quality.

BRIEF DESCRIPTION OF THE DRAWINGS

A preferred embodiment of the present invention will now be described with reference to the remaining drawings in which.

DESCRIPTION OF THE PREFERRED EMBODIMENT AND OTHER EMBODIMENTS

Figures 1, 4:
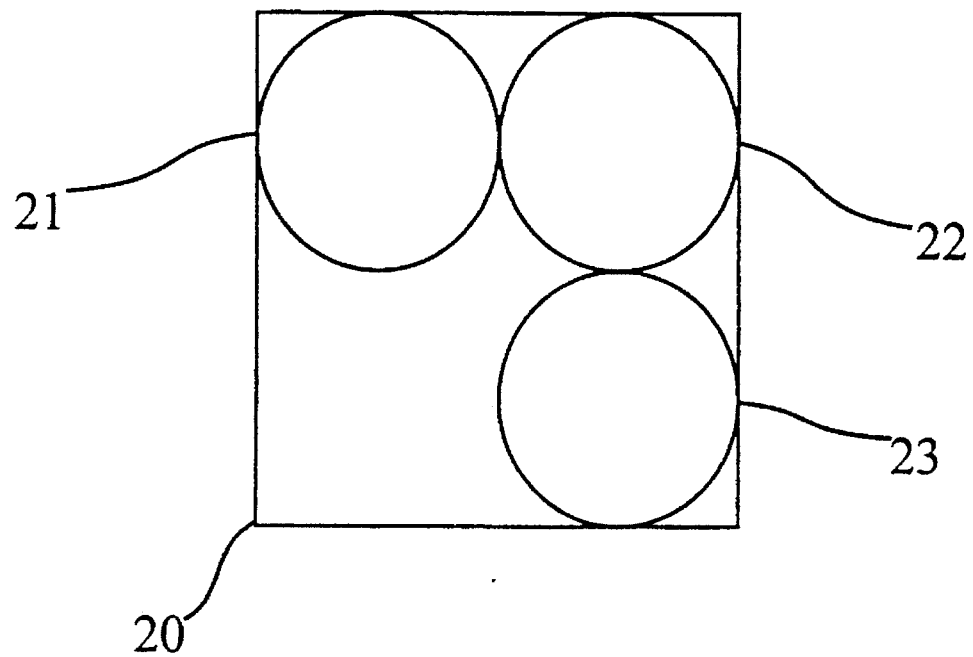
Figure 2A:
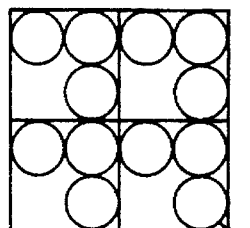
Figure 2B:
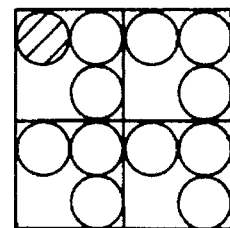
Figure 2C:
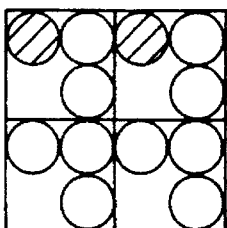
Figure 2D:
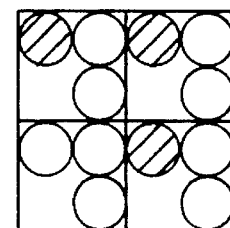
Figure 2E:
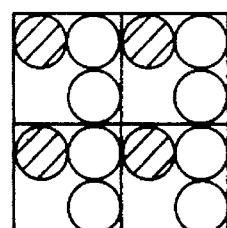
Figure 3:
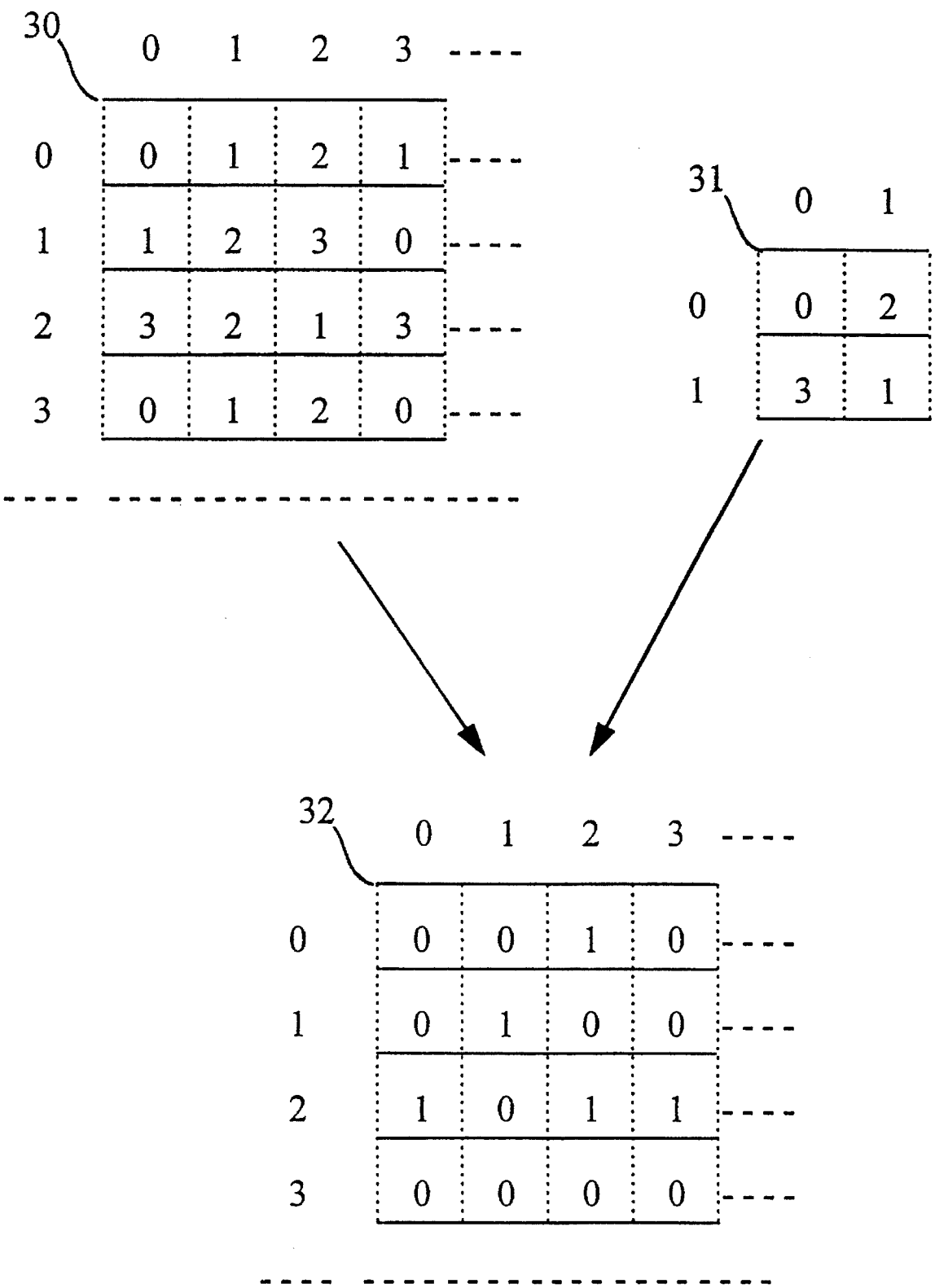

In the preferred embodiment, the value assigned to each dither matrix cell is determined using a general optimization procedure, where the entries of the dither matrix are the variables for the optimization procedure, and the objective function to be optimized is a metric which approximately measures the quality of the images which are produced by the dither matrix. The quality of the optimization method and the objective function will determine the quality of the final dither matrix. It is also important that the optimization procedure not take too long to complete or be otherwise intractable. Various methods for the reduction of the time for completion will be presented.

The preferred embodiment uses an optimization procedure called "simulated annealing" to optimize the dither matrix. Other optimization algorithms, known to those skilled in the art of computer methods of optimization, can be used. These include continuous descent algorithms, for example steepest descent and conjugate gradient algorithms, and successive approximation by a linear programming model.

A hybrid approach using multiple methods can also be used. For example, simulated annealing can be used to produce an initial dither matrix and successive approximation by a linear programming model can then be used to improve the results.

The objective function required by these optimization methods is a function producing a number which measures the "goodness" or quality of a system. In the present case, the objective function should be a measure of the quality of dithered images produced using the dither matrix. Another important consideration in the choice of objective functions is that it not take too long to calculate.

The preferred embodiment uses an objective function which tries to prevent the grouping together of output pixels, by maximizing the distance between pixels which both have the same colour; that is, both are ON or both are OFF. Other objective functions are possible. For example, one objective function can be directed to minimizing the difference between an original image which has been low-pass filtered and a low-pass filtered dithered image.

The discussion of the preferred embodiment will continue in relation to the monochrome output situation. The full colour output situation can be readily adapted by treating each primary colour independently.

PREFERRED METHOD OF FORMING AN OBJECTIVE FUNCTION

The preferred embodiment uses an objective function which measures the bunching or grouping together of pixels of the same colour in the dithered image. By the same colour, it is meant that, for a particular intensity level, two separate dither cell values will result in their respective pixels both being on or both being off. It is likely that nearby pixels of the original image have the same or similar intensities; Therefore it will be assumed that the original image has exactly the same intensity everywhere. For a given intensity in the original image, minimizing a function of the form as shown in Equation 3 leads to a smoothly dithered pattern for that intensity.

$$obj = \sum_{\substack{\text{all possible pairs of points}(p1,p2) \\ \text{with the same colour at a given intensity} \\ p1 \text{ not equal to } p2}} f(dist(p1,p2)) \quad \text{(EQ 3)}$$

The function $f$ is preferably one which decreases monotonically with distance, and $dist()$ is a measure of the distance between points $p1$ and $p2$.

Figure 6:
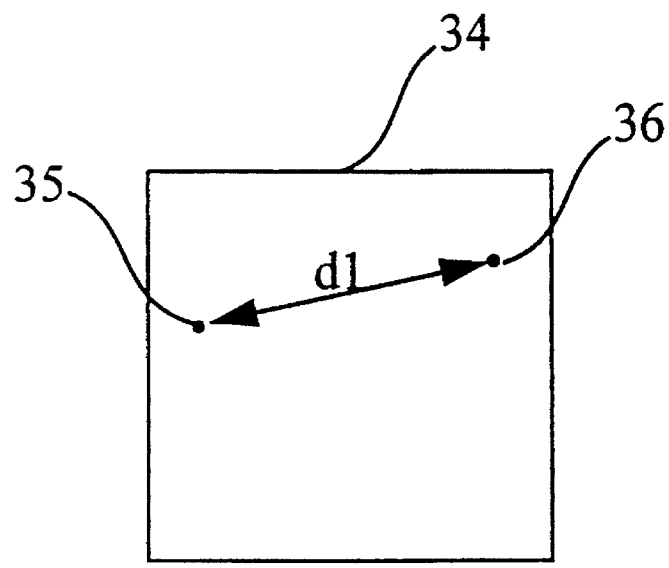
FIGS. 6(1) and 6(2) are a schematic view of the 'wrap around' distance measuring method in use with the present invention.
Figure 6:
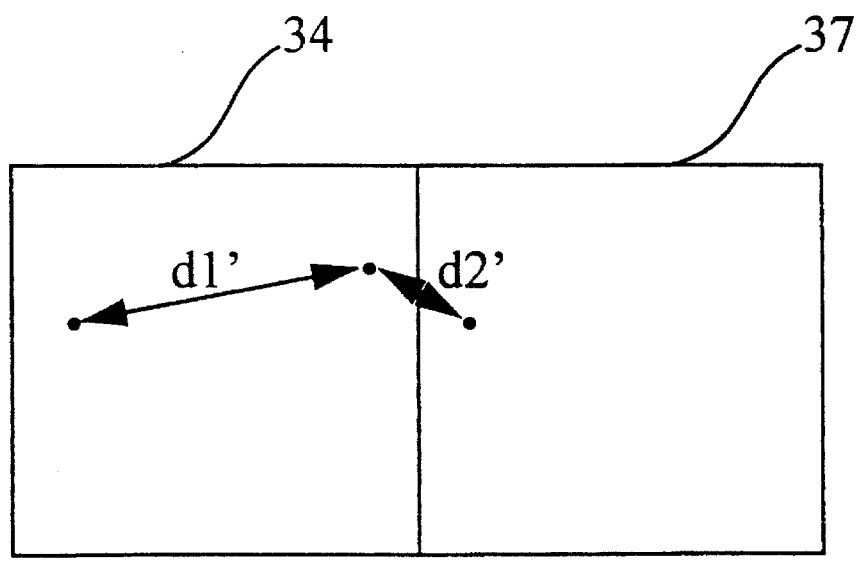

The preferred measure of distance $dist()$ is the euclidean distance between the points, but because the dither matrix is generally repeated in the vertical and horizontal directions, $dist()$ is measured modulo the size of the dither matrix. An example of this process is shown in FIGS. 6(1) and 6(2). A large matrix 34 shown in FIG. 6(1) has two pixels 35, 36 between which a distance measurement is to be taken. Normally this distance would be d1, however in a 'wrap around' sense, the boundaries of the matrix 'wrap around'. This is equivalent to a copy of the matrix 37 being placed along each axis of the original matrix 34. Hence the shortest distance between the two pixels 35,36 is d2' rather than d1'. This can be described mathematically as follows:

Let $p1=(x1,y1)$ $p2=(x2,y2)$ be two arbitrary cells in the dither matrix at positions $x1,y1$ and $x2,y2$, then, for a $n \times m$ dither matrix, the preferred distance measure is:

$$dist(p1,p2) = \sqrt{[(x1-x2) \bmod n]^2 + [(y1-y2) \bmod m]^2} \quad \text{(EQ 4)}$$

where the mod function extends to negative numbers in accordance with the following relation which holds for all x:

$$x \bmod m = (x-m) \bmod m \quad \text{(EQ 5)}$$

For example, $-3 \bmod 5 = 2 \bmod 5 = 2$

The function $f()$ is preferably chosen such that:

$$f(dist) = \frac{1}{dist^\gamma} \quad \text{(EQ 6)}$$

where $\gamma$ is a dispersion strength factor which is preferably equal to 1 although other positive values can be used.

Equation 3 gives the objective function for a single original image intensity level. To obtain an objective function which properly takes into account all possible image intensity levels, an objective function must be created which sums the quantity shown in Equation 3 for all possible intensities, as shown in Equation 7:

$$obj = \sum_{\text{(all possible intensities)}} w(\text{intensity}) \times \left[ \sum_{\substack{\text{all possible pairs of points }(p1,p2) \\ \text{with the same colour at a given intensity} \\ p1 \text{ not equal to } p2}} f(dist(p1,p2)) \right] \quad \text{(EQ 7)}$$

where $w(\text{intensity})$ is a weighting factor which assigns a relative importance to image quality at each intensity level. It will be assumed for the purposes of explanation of the preferred embodiment that each intensity level is treated equally and hence all the $w(\text{intensity})$ values are equal to 1.

In an alternative embodiment, the eyes response is taken into account in assigning weights. As the eye's response to intensity is a logarithmic function, therefore it is reasonable to assign larger weights to the smaller intensity levels. The eye's sensitivity to noise is proportional to the slope of the response curve at a given intensity; hence the following is alternative assignment of weights:

$$\begin{aligned} w(\text{intensity}) &= \frac{\partial \text{ eye response(intensity)}}{\partial \text{ intensity}} \quad \text{(EQ 8)} \\ &= \frac{\partial \log(\text{intensity})}{\partial \text{ intensity}} \\ &= \frac{1}{\text{intensity}} \end{aligned}$$

The zero intensity case can be discarded as it does not matter as it is all black, regardless of the dither matrix values.

These considerations lead to the final preferred objective function which is:

$$obj = \sum_{\text{(all possible intensities)}} \left[ \sum_{\substack{\text{all possible pairs of points}(p1,p2) \\ \text{with the same colour at a given intensity} \\ p1 \text{ not equal to } p2}} \right] \left( \frac{1}{dist(p1,p2)} \right) \quad \text{(EQ 9)}$$

ALTERNATIVE METHOD OF FORMING AN OBJECTIVE FUNCTION

An alternative approach in creation of an objective function is to try to minimize the difference between a low-pass filtered original image and the corresponding low-pass filtered dithered image. The effectiveness of this method is thought to be due to the fact that the human eye blurs all that it sees. That is, the eye applies a low-pass spatial filter to all images. Dithering and other halftoning method are thought to be effective because the blurred dithered image is very similar to a blurred version of the original image.

A dithered image can be computed for each intensity level by dithering an image with a constant intensity set at each of the predetermined levels. The resulting dithered image is then filtered, as described below, resulting in image data called a "low pass filtered dithered image" which can be stored in an array in computer memory during the computation.

The method of filtering can be done in a standard way by applying a convolution low pass filter to the image for each intensity. For example, with respect to the original image, a low filtered version of each pixel is calculated as follows:

$$\text{low pass filtered image}(x,y) = \sum_{S_x=-\text{window size}}^{+\text{window size}} \sum_{S_y=-\text{window size}}^{+\text{window size}} \quad \text{(EQ 10)}$$

$$w_{S_x,S_y} \times \text{image}((x + S_x) \bmod n, (y + S_y) \bmod m)$$

Where image(a,b) is the pixel at location a,b of the image and $w_{S_x,S_y}$ is the weighted coefficients of the filter. A low pass filtered dithered image is produced in the same manner by applying the filter to a dithered version of the image.

In the alternative objective function here described, an attempt is made to model the blurring of the human eye explicitly and directly minimize the difference between the blurred original image and the blurred dithered image.

The preferred difference metric is a sum-of-squares metric which leads to the following equation for the objective function for dithering a single, specific image:

$$\text{objective} = \quad \text{(EQ 11)}$$

$$\sum_{\text{points in dither matrix}(x,y)} (\text{low pass filtered dithered image}(x,y) -$$

$$\text{low pass filtered original image}(x,y))^2$$

As outlined previously with the preferred objective function, it is best to begin with an image at each level having a constant intensity. A low pass filtering of this image has the effect of smoothing out bumps in an image and, as the image is of one intensity, low-pass filtering a flat image will leave it unchanged.

For each possible intensity of the input image, a weight can then be assigned, determined by the relative significance of that level. Therefore the final objective function can be:

$$\text{objective} = \sum_{\text{All intensities}} w(\text{intensity}) \times \quad \text{(EQ 12)}$$

$$\sum_{\text{points in dither matrix}(x,y)}$$

$$(\text{low pass filtered dithered image}(x,y) - \text{intensity})^2$$

OPTIMIZATION OF THE OBJECTIVE FUNCTION

The preferred embodiment uses an optimization procedure called "simulated annealing" to optimize the objective function. Simulated annealing is preferred because it is partially immune to local optima, because it is fast, easy to program on a computer and suitable for very large problems. It also tends to produce disordered solutions which is a desirable property because this avoids the appearance of regular patterns in the dithered image the eye is very susceptible to.

Simulated annealing is an efficient method for finding the minimum value of a function of very many independent variables. The function, usually called a 'cost function' or 'objective function' represents a quantitative measure of the 'goodness' of some complex system.

The first step in the method is to generate an objective which has a value dependent upon a set of variables $x_1$ to $x_m$. The values of the variables $x_1$ to $x_m$ are given a small random change and the objective is re-evaluated and compared to the old value of the objective. The change in the objective will be referred to as $\Delta obj$.

If the change in the variables has resulted in a lower objective then the new set of variables is always accepted. If the change in the variables resulted in a higher value for the objective then the new set of variables may or may not be accepted. The decision to accept the new set of variables is determined with a given probability, the preferred probability of acceptance is:

$$\text{Prob}(\Delta obj) = e^{(\frac{-\Delta obj}{T})} \quad \text{(EQ 13)}$$

where T is the simulated 'temperature' of the system.

Hence for a given $\Delta obj$, a high temperature T will result in a high probability of acceptance of the change in the values of $x_1$ to $x_m$, where as at a low temperature T, there will only be a small probability of acceptance. The temperature T is initially set to be quite high and is reduced slightly in each iteration of the annealing loop. The overall structure of a computer program in pseudo code implementing the simulating annealing process is as follows:

```
T=start_temperature;
variables=start_variables loop_until(convergence or temperature_to_cold)
{
    /* generate random change of variables */
    new_variables=random_small_change(variables):

/* evaluate random change */

Δobj=objective_function(new_variables)-objective_function(variables);

if(Δobj<=0)
    {   /* always accept improvements */
        variables=new_variables;
    }
    else if(random_float_between_0_and_1()<exp(-Δobj/T))
    {
        /* sometimes accept degradation */
        variables=new_variables;
    }
    else
    {
        /* reject new_variables */
    }
    decrease T slightly, according to annealing schedule;
}
```

Figure 5:
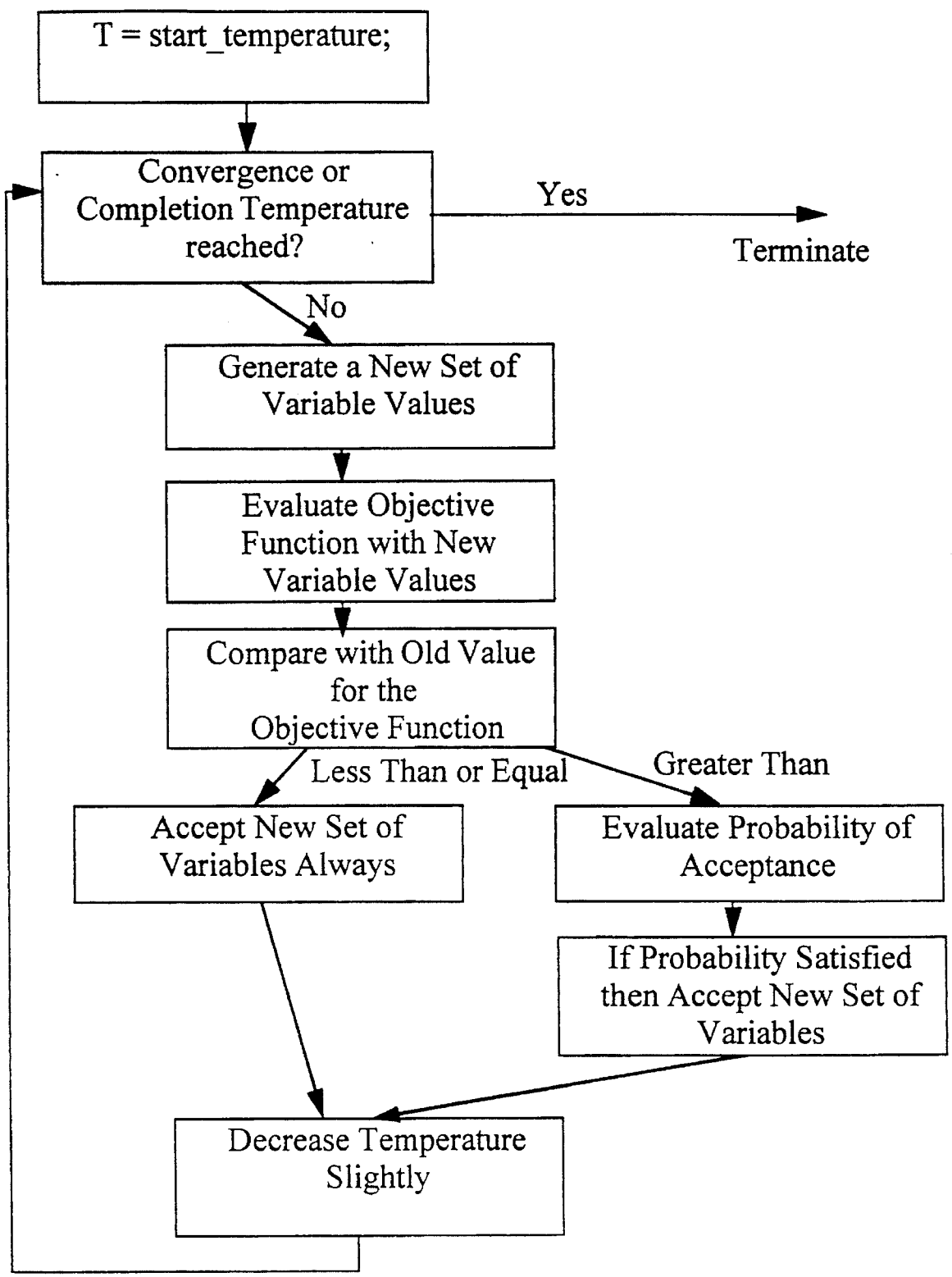
FIG. 5 is a flow chart representation of a simulated annealing algorithm.

A flow chart for use in implementing the above is shown in FIG. 5. From the chart and the foregoing description, it will be apparent that the procedure is not unlike the cooling of heated atoms to form a crystal. Hence, the term 'simulated annealing' and the reference to temperature as a measure of disorder.

To use simulated annealing to optimize a dither matrix, a method of specifying how to apply a random change (mutation) to a given dither matrix is required. The preferred random mutation method is to choose two (x,y) coordinates of the dither matrix using an unbiased random number generator. The entries of the dither matrix at these 2 places are then swapped. Whether this swap is accepted as the new solution, or rejected and therefore undone, is determined by the simulated annealing criteria previously discussed.

Theoretical considerations indicate that the anneal should begin at a temperature of infinity. In the preferred embodiment, this is achieved by randomly scrambling the dither matrix by performing the above mentioned random swap process on a very large number of dither centres accepting all swaps without evaluating the objective function.

EFFICIENT METHODS FOR THE COMPUTATION OF THE DITHER MATRIX

Unfortunately, the time required to compute medium or large sized dither matrix using the algorithm of the preferred embodiment, in its present form, is excessive. Several methods can be adopted to reduce this time and will now be described.

For an n×m dither matrix, the number of entries in the dither matrix is:

$$\text{\#entries} = n \times m \quad \text{(EQ 14)}$$

Equation 7 requires that each evaluation of the objective function is the following time order:

$$\text{Time Per Evaluation} = O(\text{\#entries}^2 \times \text{\#intensities}) \quad \text{(EQ 15)}$$
$$= O(n^2 \times m^2 \times \text{\#intensities})$$

For simulated annealing to work, every dither matrix entry must be swapped many times. If an 'epoch' is defined to be approximately equal to a number of swaps corresponding to the number of entries in the array (i.e. an epoch is approximately equal to n×m), then the simulated annealing process may typically take several hundred epochs. Therefore the time for completion will be approximately as follows:

$$\text{Time for Completion} = \text{\#epochs} \times \text{\#evaluations per epoch} \times \text{\#time per evaluation} \quad \text{(EQ 16)}$$
$$= O(\text{\#epochs} \times n^3 \times m^3 \times \text{\#intensities})$$

For a 60×60 matrix for a 256 intensity level input image, annealed for 500 epochs, the number of iterations of the inner loop will be:

$$\text{Time for Completion} = 500 \times 60^3 \times 60^3 \times 256 \text{ interations} \quad \text{(EQ 17)}$$
$$= 6.0 \times 10^{15} \text{ interations}$$

Typical workstation computers can presently do about $10^9$ iterations per hour, so such a computer would take centuries to complete the above task for the defined dither matrix size.

Now, given that D(p) is the dither matrix value at point p, then the number of intensity levels for which two dither matrix locations p1 and p2 will have the same colour (as previously defined) will be:

$$\text{\#intensities } p1, p2 \text{ have same colour} = (\text{\#intensities} - |D(p1) - D(p2)|) \quad \text{(EQ 18)}$$

Therefore Equation 9 can be rearranged as follows:

$$obj = \sum_{\substack{\text{all possible pairs of points}(p1,p2) \\ \text{with } p1 \text{ not equal to } p2}} \frac{1}{dist(p1,p2)} \cdot \quad \text{(EQ 19)}$$
$$(\text{\#intensities} - |D(p1) - D(p2)|)$$

This removes the summation over all intensities of Equation 7 resulting in a substantial overall speedup.

The number of intensities (#intensities) is a constant and adding a constant to the objective function will not change the solution resulting from the optimization. Therefore, this term can be removed from the objective function yielding:

$$obj = - \sum_{\substack{\text{all possible pairs of points}(p1,p2) \\ p1 \text{ not equal to } p2}} \frac{|D(p1) - D(p2)|}{dist(p1,p2)} \quad \text{(EQ 20)}$$

Further speedups can be obtained by noting that the simulated annealing process only requires the computation of the change in the objective function due to the swapping of two dither matrix entries and computation of the full objective is not actually required. Most of the points in Equation 20 are unaltered when two dither matrix entries are swapped and only pairs involving one of the two chosen points involved in the swap change their values.

The contribution to Equation 20 of a dither matrix entry Dc being located at point pc (ob_dp) is given by:

$$ob\_dp(Dc,pc) = - \sum_{\text{all points } p,p \text{ not equal to } pc} \frac{|Dc - Dp|}{dist(pc,p)} \quad \text{(EQ 21)}$$

Therefore, the change in the objective function given in Equation 20 due to swapping the dither matrix values located at the points p1 and p2 is given by:

$$\Delta objective = ob\_dp(D2,p1) + ob\_dp(D1,p2) - ob\_dp(D1,p1) - ob\_dp(D2,p2) \quad \text{(EQ 22)}$$

where dither matrix value D1 starts at point p1 and moves to point p2, and dither matrix value D2 starts at point p2 and moves to point p1.

The evaluation of Equation 22 requires the examination of every point of the dither matrix four times, rather than examination of every pair of points of the dither matrix as required by Equation 20.

This again results in a substantial speedup and Equation 21 and Equation 22 are preferably used in the creation of small and medium sized dither matrices.

The analysis leading to Equation 21 and Equation 22 can also be applied to the more general Equation 7, leading to the more general formulation for Equation 21 given by:

$$ob\_dp(Dc,pc) = - \sum_{\text{all points } p,p \text{ not equal to } pc} |Dc - Dp| \cdot f(dist(pc,p)) \quad \text{(EQ 23)}$$

The time taken to create a dither matrix using Equation 22 is:

$$\text{Time for Completion} = \text{\#epochs} \times \text{\#evaluations per epoch} \times \text{\#time per evaluation} \quad \text{(EQ 24)}$$
$$= O(\text{\#epochs} \times n^2 \times m^2)$$

This compares favorably with Equation 16 and is practical for small to medium sized dither matrices (less than say 5,000 entries).

For large dither matrixes, further speedup is required to make the annealing practical. This can be achieved by using simple approximations.

The computation involved in Equation 21 involves an inverse distance relationship. This involves a large number of points that contribute very little to the final result because they are a large distance away from pc, which is the point of interest. The approximation involves neglecting the contribution of these points, and only using points which are within a small distance of pc. This imposes a circular window about pc with a radius designated as "window_radius".

$$ob\_dp(Dc,pc) = - \sum_{\substack{\text{all points } p,p \text{ not equal to } pc \\ \text{and } dist(p,pc) \leq \text{window\_radius}}} \frac{|Dc - Dp|}{dist(pc,p)} \quad (EQ\ 25)$$

Use of Equation 25 was found, in practice, to give inferior resulting dither matrices because of the discontinuity introduced at the dist()==window_radius. This discontinuity is remedied by using instead the following formula:

$$ob\_dp(Dc,pc) = \quad (EQ\ 26)$$

$$- \sum_{\substack{\text{all points } p,p \text{ not equal to } pc \\ \text{and } dist(p,pc) \leq \text{window\_radius}}} |Dc - Dp| \cdot \left( \frac{1}{dist(pc,p)} - \frac{1}{\text{window\_radius}} \right)$$

which removes this discontinuity and is used in the preferred embodiment when a larger dither matrix is required.

The function ob_dp used in Equation 21 can be defined for the more general Equation 23 to be:

$$ob\_dp(Dc,pc) = - \sum_{\text{all points } p,p \text{ not equal to } pc} |Dc - Dp| \cdot \quad (EQ\ 27)$$

$$(f(dist(pc,p)) - f(\text{window\_radius}))$$

The time to compute dither matrixes using Equation 26 or Equation 27 is then of the following order:

$$\text{Time for Completion} = O(\text{\#epochs} \times n \times m \times \text{window\_radius}^2) \quad (EQ\ 28)$$

This has been found to be practical even for creating of very large dither matrices. Reasonable values for window_radius have been found to be between 7 and 12.

THE SIZE OF A DITHER MATRIX AND THE NUMBER OF LEVELS

The actual size of the dither matrix used and the number of levels within the dither matrix involves a compromise between a number of conflicting issues, including:

1) a bigger dither matrix generally gives improved results;

2) a smaller dither matrix uses less memory storage in implementation and takes less time to generate.

3) a square dither matrix is simpler to work with than a dither matrix where length is not equal to the width;

4) implementation hardware is generally simpler if the width and length of the dither matrix are powers of 2;

5) to make the dither matrix give the same average intensity in the dithered image as in the input image, the same number of dither matrix entries should have each level. If exact equality is impossible, the levels should be distributed as evenly as possible; and 6) the number of dither matrix levels should satisfy the relationship:

$$\text{\#dither\_matrix\_levels} = \text{\#intensities} - 1 \quad (EQ\ 29)$$

A standard number of intensities often used in practice is 256, therefore #dither_matrix_levels=255.

The simplest and most straightforward method is to set the number of dither matrix levels according to Equation 29 where #intensities is the number of intensities in the input.

Once the number of levels has been determined the next step is to determine the size of the dither matrix.

One method of determining the matrix size is to choose the length and width of the dither matrix such that $$\text{length} \ast \text{width} = K \ast \text{\#dither\_matrix\_levels} \quad (EQ\ 30)$$

where K is a positive integer and then assign each level to K dither matrix entries.

For example, if #intensities=256, then #dither_matrix_levels=255. Now 255 =15*17. A possible dither matrix size is length=15, width=17, which gives K=1. A bigger possibility is length=2*15=30, width=2*17=34, K=4. A still bigger possibility is length=4*15=60, width=4*17=68, K=16.

Although it would be desirable that the matrix was square, the constraint that each level must be assigned K dither matrix entries means that the resultant matrix must be rectangular.

Another possible way to set the size of the dither matrix is to relax the requirement that each level be assigned to an equal number of dither matrix entries, and to assign them as evenly distributed as possible. The size of the dither matrix should be first fixed according to hardware cost considerations, desired dither matrix size etc., but independently from #dither_matrix_levels and #intensities. Equation 29 is then used to set the number of dither levels as above. The assigned levels to the dither matrix are assigned so that the extra or remainder levels are spread as evenly as possible between the minimum and maximum possible levels.

The preferred method of assignment is a variation of the above which is started by fixing the size of the dither matrix but independently from #dither_matrix_levels and #intensities. After the dither matrix size is chosen, the number of levels in the dither matrix is set according to $$\text{\#dither\_matrix\_levels} = \text{len} \ast \text{width}. \quad (EQ\ 31)$$

With this setting, each dither matrix entry is assigned exactly 1 level, and the dither matrix is optimized according to the methods discussed previously. For the resulting dither matrix to be usable, its entries must be rounded so that Equation 29 is satisfied. The preferred rounding formula to achieve this is as follows:

$$\text{New Dither Entry} = \left\lfloor \left( \frac{\text{old dither entry} + \frac{1}{2}}{\text{length} \times \text{width}} \right) \times (\text{\#intensities} - 1) \right\rfloor \quad (EQ\ 32)$$

By using the simulated annealing process as described above, an improved dither matrix can be obtained. The generation of the necessary electrical inputs and outputs follows essentially the conventional techniques, save that the application of the dither process in the course of those techniques is as described above instead of conventional dither processes.

Figure 7:
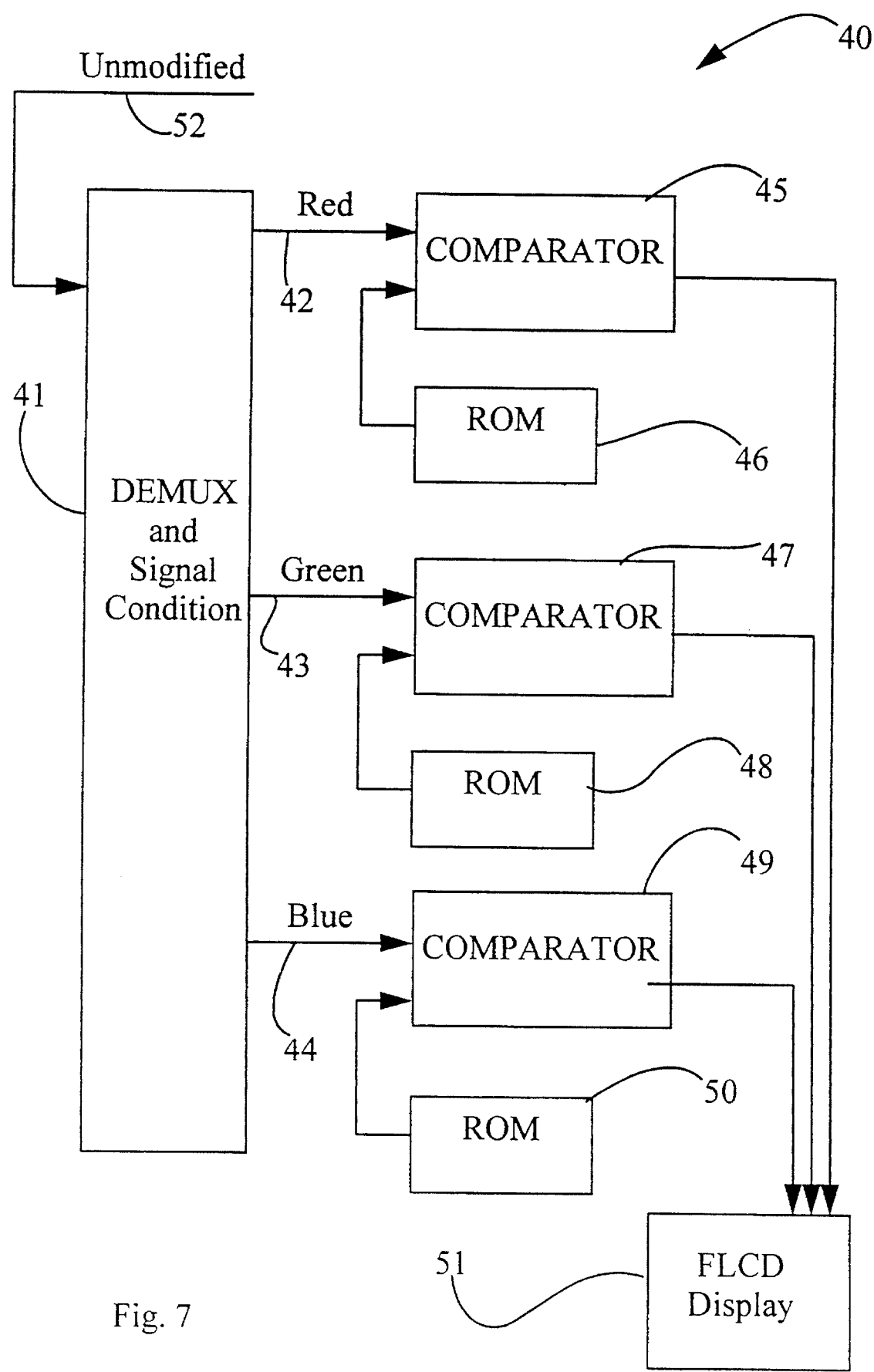
FIG. 7 is a schematic block diagram incorporating a dither matrix constructed in accordance with the preferred embodiment of the present invention.

FIG. 7 is a block diagram of the electrical circuit used for the necessary generation of display data. A dither circuit 40 is shown which receives an unmodified composite video signal 52. The signal 52 is input to a demultiplexer and signal conditioner 41 which breaks the signal down into digital RGB data with each colour component being output on a separate line 42, 43, and 44 respectively.

Each colour component 42,43 and 44 is input to a corresponding comparator 45,47,49 which is also supplied with a signal input derived from a corresponding read-only-memory (ROM) 46,48,50. Each ROM contains a look-up table corresponding to the values of the corresponding dither matrix for that colour. Each comparator can thereby determine any difference in magnitude between the two inputs and provide a digital output direct to an FLCD display device 51 for display.

The foregoing describes only one embodiment of the present invention, modifications, obvious to those skilled in the art, can be made thereto without departing from the scope of the present invention.

For example, the present invention can be applied to a variety of colour models without significant changes by the application of the above to each colour in turn and has general application where halftoning of images is required.

I claim:

1. A computer implemented method for determining the values of a dither matrix comprising an array of points, said method comprising the steps of:

assigning an initial dither value to each point in the dither matrix;

forming a suitable objective function based on said assignment, wherein said objective function includes an inverse distance factor between different points in the dither matrix; and optimizing said objective function through alteration of said dither values and generating an optimized dither matrix, wherein said objective function is of the form:

$$obj = \sum_{\text{(all possible intensities)}} w(\text{intensity}) \times \left[ \sum_{\substack{\text{all possible pairs of points } (p1,p2) \\ \text{with the same colour at a given intensity} \\ p1 \text{ not equal to } p2}} f(\text{dist}(p1,p2)) \right]$$

where dist(p1, p2) is a measure of distance between the dither points p1 and p2, f() is a function which decreases with distance, and w(intensity) is a weighting factor for each intensity level.

2. A method as recited in claim 1, wherein $$f(\text{dist}(p1,p2)) = \frac{1}{\text{dist}^\gamma(p1,p2)}$$

where $\gamma$ is a dispersion strength factor of positive magnitude.

3. A method as recited in claim 1, wherein w(intensity) varies inversely with the intensity level.

4. A method as recited in claim 1, wherein said objective function is $$\text{objective} = \sum_{\text{All intensities}} w(\text{intensity}) \times \sum_{\text{points in dither matrix}(x,y)} (\text{low pass filtered dithered image}(x,y) - \text{intensity})^2 \quad (\text{EQ 1})$$

where w(intensity) is a weighting factor for each intensity level and low pass filtered dithered image(x,y) is the pixel value at position x,y of a low pass filtered image which has also been dithered.

5. A method as claimed in claim 4 wherein said low pass filtered image is an image of a constant intensity level equivalent to the intensity level under summation.

6. A method as claimed in claim 1 wherein said objective function is:

$$obj = -\sum_{\substack{\text{all possible pairs of points}(p1,p2) \\ \text{with } p1 \text{ not equal to } p2}} \frac{|D(p1) - D(p2)|}{\text{dist}(p1,p2)}$$

wherein dist(p1,p2) is a distance measure between p1 and p2 and D(p) is the dither matrix value at point p.

7. A method as recited in claim 1, wherein said optimizing step comprises simulated annealing of an objective function, and said simulated annealing includes a random perturbation of said dither matrix comprising swapping two dither point values D1, D2, located at positions p1 and p2 and forming a $\Delta$objective function, wherein said $\Delta$objective is defined as follows:

$$\Delta\text{objective} = ob\_dp(D2,p1) + ob\_dp(D1,p2) - ob_{13}\ dp(D1,p1) - ob\_dp(D2,p2)$$

wherein ob_dp(Dc,pc) is defined as follows:

$$ob\_dp(Dc,pc) = -\sum_{\text{all points } p,p \text{ not equal to } pc} \frac{|Dc - Dp|}{\text{dist}(pc,p)}$$

wherein Dc is the value of the dither matrix at point c, Dp is the value of the dither matrix at point p and dist(pc,p) is a distance measure between the points pc and p.

8. A method as claimed in claim 1 wherein said optimizing step comprises simulated annealing of an objective function and said simulated annealing includes a random perturbation of said dither matrix comprising swapping two dither point values D1, D2, located at positions p1 and p2 and forming a $\Delta$objective function, wherein said $\Delta$objective is defined as follows:

$$\Delta\text{objective} = ob\_dp(D2,p1) + ob\_dp(D1,p2) - ob\_dp(D1,p1) - ob\_dp(D2,p2)$$

wherein ob_dp(Dc,pc) is defined as follows:

$$ob\_dp(Dc,pc) = -\sum_{\substack{\text{all points } p,p \text{ not equal to } pc \\ \text{and } \text{dist}(p,pc) \leq \text{window\_radius}}} \frac{|Dc - Dp|}{\text{dist}(pc,p)}$$

wherein Dc is the value of the dither matrix at point c, Dp is the value of the dither matrix at point p and dist(pc,p) is a distance measure between the points pc and p and window_radius is a predetermined radius of influence for which points will be taken into account in determining the objective.

9. A method as claimed in claim 1 wherein said optimizing step comprises simulated annealing of an objective function and said simulated annealing includes a random perturbation of said dither matrix comprising swapping two dither point values D1, D2, located at positions p1 and p2 and forming a $\Delta$objective function, wherein said $\Delta$objective is defined as follows:

$$\Delta\text{objective} = ob\_dp(D2,p1) + ob\_dp(D1,p2) - ob\_dp(D1,p1) - ob\_dp(D2,p2)$$

wherein ob_dp(Dc,pc) is defined as follows:

$$ob\_dp(Dc,pc) = -\sum_{\substack{\text{all points } p,p \text{ not equal to } pc \\ \text{and } \text{dist}(p,pc) \leq \text{window\_radius}}} |Dc - Dp| \cdot$$

$$\left( \frac{1}{dist(pc,p)} - \frac{1}{window\_radius} \right)$$

wherein Dc is the value of the dither matrix at point pc, Dp is the value of the dither matrix at point p and dist(pc,p) is a distance measure between the points pc and p and window_radius is a predetermined radius of influence for which points will be taken into account in determining the objective.

10. A method as recited in claim 1, wherein the optimizing step comprises simulated annealing of the objective.

11. A method as recited in claim 1, wherein said optimizing step comprises simulated annealing of the objective and said simulated annealing includes a random perturbation step and said random perturbation includes swapping the values of a plurality of elements of the dither matrix.

12. A method as recited in claim 1 wherein the number of independent levels is initially chosen to be equivalent to the size of the dither matrix and, after said optimizing step, the number of independent levels is reduced to a predetermined number of intensity levels.

13. A method as recited in claim 12, wherein said reduction utilizes the following rounding formula:

$$\text{New Dither Entry} = \left\lfloor \left( \frac{\text{old dither entry} + \frac{1}{2}}{\text{dither matrix size}} \right) \times (\text{\#intensities} - 1) \right\rfloor$$

where New Dither Entry is the final dither value, old dither entry is the dither value of the point undergoing reduction, dither matrix size is the size of the dither matrix and #intensities is the desired number of intensities.

14. A method as recited in claim 1, wherein the size of the dither matrix is chosen to be an integral multiple of a predetermined number, said predetermined number being one less than a predetermined number of intensity levels than the dither matrix is to dither.

15. A method as recited in claim 1, wherein said dither matrix is used to optimize the display of an image on a display apparatus.

16. A method as recited in claim 15, wherein said display apparatus is a ferroelectric liquid crystal display.

17. An image data generator comprising:
 a memory containing values of a dither matrix at locations in said memory corresponding to locations in the matrix;
 comparator means for comparing each pixel of the image to be displayed with the value in said memory at the modulo location corresponding to the pixel, an output of the comparator means being activated if the stored value is greater than the pixel value and that output being displayed on display means for displaying an image, and if the stored value is less than the pixel value, then said display means is not activated; and
 means for (i) determining values in the dither matrix by determining a suitable objective function for display of corresponding dither pixels, wherein said objective function includes an inverse distance factor between different points in said dither matrix, and for (ii) optimizing said objective function to improve image quality and generating an optimized dither matrix, wherein said objective function is of the form:

$$obj = \sum_{\text{(all possible intensities)}} w(\text{intensity}) \times$$

$$\left[ \sum_{\substack{\text{all possible pairs of points } (p1,p2) \\ \text{with the same colour at a given intensity} \\ p1 \text{ not equal to } p2}} f(dist(p1,p2)) \right]$$

where dist(p1, p2) is a measure of distance between the dither points p1 and p2, f() is a function which decreases with distance, and w(intensity) is a weighting factor for each intensity level.

18. A generator as set forth in claim 17, further comprising means for determining the values of the dither matrix by assigning initial values to each point in the dither matrix, forming a suitable objective function based on said assignment, and optimizing said objective function through alteration of said dither values.

19. A computer implemented method for determining the values of a dither matrix comprising an array of points, said method comprising the steps of:
 assigning initial values to each point in the dither matrix;
 forming a suitable objective function based on said assignment, wherein said objective function includes an inverse distance factor between different points in the dither matrix; and
 optimizing said objective function through alteration of said dither values,
 wherein said optimizing step comprises simulated annealing of the objective function, and said simulated annealing includes a random perturbation of said dither matrix comprising swapping two dither point values D1, D2, located at positions p1 and p2 and forming a $\Delta$ objective function, wherein said $\Delta$ objective is defined as follows:

$$\Delta \text{ objective} = ob\_dp(D2,p1) + ob\_dp(D1,p2) - ob\_dp(D1,p1) - ob\_dp(D2,p2)$$

wherein ob_dp(Dc,pc) is defined as follows:

$$ob\_dp(Dc,pc) = -\sum_{\text{all points } p,p \text{ not equal to } pc} \frac{|Dc - Dp|}{dist(pc,p)}$$

wherein Dc is the value of the dither matrix at point c, Dp is the value of the dither matrix at point p, and dist(pc,p) is a distance measure between the points pc and p.

20. A computer implemented method for determining the values of a dither matrix comprising an array of points, said method comprising the steps of:
 assigning initial values to each point in the dither matrix;
 forming a suitable objective function based on said assignment, wherein said objective function includes an inverse distance factor between different points in the dither matrix; and
 optimizing said objective function through alteration of said dither values,
 wherein the number of independent dither levels is initially chosen to be equivalent to the size of the dither matrix and, after said optimizing step, the number of independent dither levels is reduced to a predetermined number of intensity levels, and said reduction utilizes the following rounding formula:

$$\text{New Dither Entry} = \left[ \left( \frac{\text{old dither entry} + \frac{1}{2}}{\text{dither matrix size}} \right) \times (\text{\#intensities} - 1) \right]$$

where New Dither Entry is the final dither value, old dither entry is the dither value of the point undergoing reduction, dither matrix size is the size of the dither matrix, and #intensities is the desired number of intensities.

* * * * *

UNITED STATES PATENT AND TRADEMARK OFFICE
CERTIFICATE OF CORRECTION

PATENT NO.   : 5,526,021
DATED        : June 11, 1996
INVENTOR(S)  : Naylor, Jr.

It is certified that error appears in the above-indentified patent and that said Letters Patent is hereby corrected as shown below:

COLUMN 9:

Line 45, "256 interations" should read --256 iterations--.
Line 46, "6.0 x $10^{15}$ interations" should read --6.0 x $10^{15}$ iterations--.

COLUMN 14:

Line 17, "$\Delta$objective=ob_dp(D2,p1)+ob_dp(D1,p2)-ob_{13} dp(D1,p1) ob_dp(D2,p2)" should read --$\Delta$objective=ob_dp(D2,p1)+ ob_dp(D1,p2)-ob_dp(D1,p1)-ob_dp(D2,p2)--.

Signed and Sealed this

Nineteenth Day of November, 1996

Attest:

BRUCE LEHMAN

*Attesting Officer*     *Commissioner of Patents and Trademarks*